United States Patent [19]

Welschof et al.

[11] Patent Number: 4,878,882
[45] Date of Patent: Nov. 7, 1989

[54] CROSS GROOVE CONSTANT VELOCITY RATIO UNIVERSAL JOINTS

[75] Inventors: Hans-Heinrich Welschof, Rodenbach; Peter Schwärzler, Glattbach, both of Fed. Rep. of Germany

[73] Assignee: Löhr & Bromkamp GmbH, Offenbach am Main, Fed. Rep. of Germany

[21] Appl. No.: 176,849

[22] Filed: Apr. 4, 1988

[30] Foreign Application Priority Data

Apr. 2, 1987 [DE] Fed. Rep. of Germany ....... 3710572

[51] Int. Cl.$^4$ .............................................. F16D 3/21
[52] U.S. Cl. ..................... 464/144; 464/906
[58] Field of Search ............... 464/140, 144, 145, 146, 464/906

[56] References Cited

U.S. PATENT DOCUMENTS

| | | | |
|---|---|---|---|
| Re. 30,606 | 5/1981 | Sharp | 464/140 X |
| 2,911,805 | 11/1959 | Wildhaber | 464/146 |
| 3,475,924 | 11/1969 | Aucktor | 464/144 |
| 3,603,111 | 9/1971 | Aucktor et al. | 464/146 |
| 3,785,172 | 1/1974 | Parsons | 464/146 |
| 4,232,756 | 11/1980 | Bathelt | 464/146 X |
| 4,325,232 | 4/1982 | Girguis | 464/144 |

FOREIGN PATENT DOCUMENTS

125341 9/1979 Japan .................. 464/146

Primary Examiner—Daniel P. Stodola
Attorney, Agent, or Firm—Toren, McGeady & Associates

[57] ABSTRACT

A cross groove type of constant velocity ratio universal joint, comprising an outer joint member (1), an inner joint member (2), and a cage (3) constraining torque transmitting balls (4) received one in each pair of facing grooves (8, 14) in the outer and inner joint members, the grooves being inclined to the axes of the joint members so as to cross one another, wherein the cage is of asymmetrical configuration, comprising at one end an opening of a diameter greater than an outside diameter of the inner joint member, and at its other end and opening of a diameter smaller than the outside diameter of the inner joint member. The external surface of the cage comprises a number of surface portions (S1 to S5) of different configuration from one another. The configuration of the cage facilitates assembly of the joint and also permits an extended range of plunging movement in one direction, while limiting plunging movement in the opposite direction.

17 Claims, 8 Drawing Sheets

CROSS GROOVE CONSTANT VELOCITY RATIO UNIVERSAL JOINTS

BACKGROUND TO THE INVENTION

1. Field of the Invention

This invention relates to constant velocity ratio universal joints of the cross groove type, comprising inner and outer joint members having circumferentially disposed axially extending facing pairs of grooves which receive balls for torque transmission between the joint members, the grooves of each pair being oppositely inclined to the rotational axes of their joint members so that they cross one another as viewed in a direction transverse to such axes, the joint further comprising a cage of annular form disposed between the joint members and having apertures wherein the balls are received to constrain the balls such that their centres occupy a common plane. When the joint is articulated, the configuration of the grooves causes such common plane to bisect the angle between the rotational axes of the joint members, to give the joint the required constant velocity ratio characteristics. The joint is able to accommodate relative axial movement (so called "plunge") between the joint members, the balls moving along the grooves in the joint members during such relative axial movement. Such joints will herein be referred to for convenience simply as cross groove joints.

2. Prior Art

Cross groove joints are sold by the assignee of the present application under the designation VL joints, such joints being useful in universally jointed motor vehicle drive shafts where one of the joints must be capable of accommodating plunge in order to permit installation of a shaft and to allow for geometrical changes with suspension movement in use.

In one known type of cross groove joint (designated as VL-91) the cage for constraining the balls, which is generally in the form of an annular shell with part-spherical internal and external surfaces, has an opening extending through it which is larger than the overall outside diameter of the joint inner member. It is therefore possible to assemble the joint, and in particular to assemble the cage to the inner joint member, simply by feeding the inner joint member axially into the cage. However, when the joint is assembled, the cage cannot engage with the inner joint member to limit the range of plunging movement permitted by the joint. It will be appreciated that, when the joint plunges, the cage moves axially relative to the inner joint member by a distance equal to half the distance by which the inner joint member moves relative to the outer joint member, and if the cage were arranged to engage the inner joint member to prevent relative movement therebetween it would consequently limit movement between the inner and outer joint members.

Therefore, with such a known type of joint, some means has to be provided elsewhere to limit plunge in the joint. For example, if a drive shaft incorporates two plunging joints, the other joint must incorporate some plunge-limiting stops. A further disadvantage of such a joint is that the angle to which the joint can articulate is relatively limited, and the torque transmitting capacity decreases considerably at larger angles of articulation.

In a further known type of cross groove joint (designated VL-107) the cage has at each end an aperture which is smaller than the overall outside diameter of the joint inner member. This requires assembly of the joint by articulation of the cage relative to the inner joint member through an angle greater than that which will occur in service. This also requires some changes in the cross-sectional shape of the ball-receiving grooves in the inner joint member. When a joint of this type is assembled, the cage will co-operate with the inner joint member to limit relative axial movement between these parts, and hence will limit the overall plunging movement which the joint can provide. This is advantageous in operation, but the limit on plunging movement may render installation of a drive shaft equipped with such a joint more difficult. It will be appreciated that to install a drive shaft may require the shaft to be shortened very considerably, necessitating maximum plunge capability in one or both of the joints thereof.

SUMMARY OF THE INVENTION

It is the object of the present invention to provide a cross groove universal joint wherein the above described disadvantages of known joints are overcome or reduced.

According to the present invention, we provide a cross groove universal joint wherein, as viewed in longitudinal section, the cage is assymetrical and has at one end an opening of a diameter greater than the maximum diameter of the inner joint member, and at its other end has an opening of a diameter smaller than the maximum diameter of the inner joint member, so that the cage can be fitted by moving said one end thereof over the inner joint member, and said other end of the cage forms a stop limiting relative axial movement between the cage and inner joint member.

To assemble a joint according to the invention, the cage can be fitted axially over the inner joint member, and, with the inner joint member and cage partially within the outer joint member, the balls are then individually introduced into the grooves in the joint members and the apertures in the cage by tilting (articulating) the joint members and cage relative to one another to provide room for the balls to be fitted. Such articulation of the joint will be to an angle (herein referred to for convenience as the assembly angle) greater than that to which the joint is intended to be articulated for continuous running in normal use. If the joint inner member is integral with a shaft part, e.g. with a tubular shaft, the cage is to be fitted axially from the end of the inner joint member from which the shaft extends, so that if the joint is to form part of a shaft assembly having two joints, the other joint cannot be assembled until the cage has been slid along the shaft from its free end.

The outer member of a joint according to the invention is usually in the form of a part with a closed end, and the end of the cage having the larger diameter opening will then be that which is adjacent such closed end. Then, the unrestricted plunging movement of the joint, permitted since the inner joint member will not meet the cage to form a stop, will be in the direction such that the inner joint member moves towards the closed end of the outer joint member, i.e. the direction of shortening of a shaft assembly in which the joint is provided. This facilitates installation of such a shaft in a motor vehicle or other situation where it is to be used. In the opposite direction of plunging movement, engagement of the inner joint member with the cage at the end thereof having the smaller diameter opening will limit plunging movement of the joint, such that the inner joint member cannot unintentionally be withdrawn from the outer joint member.

Preferably, as viewed in longitudinal section, the external surface of the cage comprises a number of longitudinally extending portions which are of different configuration from one another. Particularly, the external surface of the cage may comprise a first portion, towards the end of the cage having the larger diameter opening, and a further portion towards the end of the cage having the smaller diameter opening, both of which portions are convex surfaces of revolution about the longitudinal axis of the cage and which, as viewed in longitudinal section of the cage, have centres of curvature which lie in the ball centre plane but which are offset from the longitudinal axis of the cage, the first portion having a radius of curvature greater than that of the further portion.

The purpose of this is to provide the cage with a sufficient wall thickness, at its end with the larger diameter opening, for its strength not to be adversely affected by the larger opening therein and also without limiting its ability to articulate relative to the outer joint member during assembly. When the joint is articulated, the cage presents to the interior of the outer joint member, transverse to the axis of the outer joint member, an overall dimension which is approximately equal to half the diameter of the convex surface with the greater curvature plus half the diameter of the surface with the small curvature which together approximately correspond to the inner diameter of the outer joint member.

It is necessary of course, to provide the usual clearances between the inner and outer joint members. The important feature of the invention is that, at its end with the larger opening, the cage has been reinforced by the provision of additional material on its outside surface which compensates for the loss of material inside the cage. In this way any loss in strength of the cage, and torque transmitting ability of the joint, is minimised.

In principle, it would be feasible for the two above mentioned convex surface portions of the cage to adjoin one another directly at the ball centre plane. However, the external surface of the cage preferably comprises a part-spherical surface portion in the region of the apertures in the cage. Such part-spherical surface portion may be predominantly that which is adjacent the outer joint member in the normal operating range of the joint. Preferably the radius of curvature of such part-spherical surface portion lies between the radii of curvature of said first and further surface portions, and the centre of curvature of said part-spherical surface portion lies in the ball centre plane. To the extent that the part-spherical surface portion extends from the ball centre plane on opposite sides thereof, unchanged operating conditions in respect of clearances between the cage and outer joint member exist when the joint is articulated in normal use.

However, in a particular embodiment of the invention described hereafter it is proposed that the part-spherical surface portion of the external surface of the cage may extend, as the cage is viewed in longitudinal section, from the ball centre plane towards the end of the cage having the larger opening by a distance sufficient to subtend approximately half the normal maximum operating angle of the joint at its centre of curvature (which is on the axis of the cage and in the ball centre plane). Such subtended angle may be about eleven degrees. This means that when the joint is articulated in normal use, part of the cage surface which is adjacent the internal surface of the outer joint member is that provided by the part-spherical surface, whilst the other part of the cage is on the further convex surface portion thereof of smaller radius of curvature.

If in the course of assembly the joint is over-articulated beyond its normal operating angle, the first and further convex portions of the external surface of the cage, towards the ends of the cage, will present themselves to the internal surface of the outer joint member. The distance, transversely of the outer joint member, between these cage surfaces must be no more than equal to the internal diameter of the outer joint member; thus the sum of the said radii of curvature of the first and further convex surface portions of the cage has to be substantially equal to, or slightly less than, twice the radius of curvature of the part-spherical surface portion of the cage. It will be appreciated that when the joint is over-articulated for assembly purposes, some radial displacement of the cage occurs.

Preferably the cage of a joint according to the invention possesses substantially all the features above set forth.

The external surface of the cage may include, as a transition portion between the part-spherical surface portion thereof and the first said convex surface portion thereof, either a frusto-conical surface portion tangentially adjoining the part-spherical surface portion, or a surface of rotation about the axis of the cage which is concave as viewed in longitudinal section of the cage. As a result of this, the amount of material in the cage in its region having the first convex surface portion can be increased.

In order to enable the ball tracks in the joint members to be given adequate depth, and thus to gain an advantage in respect of torque transmitting capability of the joint even when articulated at a large angle, in a preferred embodiment the further convex surface portion of the cage (towards the end of the cage having the smaller opening, and having the smaller radius of curvature) extends from the ball centre plane to subtend at least half the normal operating angle and preferably half the assembly angle of the joint at its centre of curvature as viewed in longitudinal section of the cage. Such convex surface portion may then be followed, towards the end of the cage, by a frusto conical surface portion which tapers at at least half the assembly angle of the joint.

Other important features of joint according to the invention are concerned with the internal configuration of the cage. Starting from the end thereof with the larger opening, the interior of the cage may be of cylindrical configuration in a first portion extending as far as the boundaries of the apertures in the cage wherein the balls are received, followed by a portion whose configuration approximately follows that of the external surface of the cage to give a substantially constant wall thickness.

It is also advantageous if the interior of the cage comprises, at its end adjacent the smaller opening, a part-spherical portion which forms a stop surface, preferably corresponding to a substantially part-spherical stop surface of the joint inner member. If such stop surfaces are of the same radius of curvature as one another, and because lubricant is present, such stop surfaces can operate in a generally wear-free way.

At its end opposite the said stop surface, the inner joint member may be provided with a part-spherical surface having the same radius of curvature as that of said stop surface, but with its centre of curvature off-set along the axis of the inner joint member from the centre of curvature of the stop surface. However, such second part-spherical surface does not have any particular operative function, so that instead of a part-spherical surface a simpler configuration could be used, e.g. aconical surface. Between such surfaces towards the ends of the inner joint member, the external surface, between the ball-receiving grooves, of the inner joint member may be of a linear sectional configuration such as cylindrical and/or slightly conical, in order to obtain a generally constant depth of the grooves therein, the outside diameter of such portion being related to that of the larger opening at the one end of the cage.

As above described, a joint according to the invention affords a relatively greater plunging capacity than hitherto known cross groove joints wherein the cage has two stop surfaces which limit its axial movement relative to the inner joint member in opposite directions. This increased plunging capability is advantageous for assembling joints and drive shafts incorporating such joints.

The effective plunging distance provided by a joint according to the invention may be increased further by providing the inner joint member, beyond its part-spherical stop surface, with a generally cylindrical region in which the ball grooves are continued, the diameter of which cylindrical region is smaller than the diameter of the smaller opening in the cage. The purpose of such provision is apparent; without disengaging the balls from the grooves it becomes possible axially to slide the inner joint member even farther out of the cage at the end thereof having the larger opening. The cage itself may even move beyond the extent of the ball-receiving grooves in the outer joint member. In the case of a joint outer member with a closed end, the joint inner member may be enabled to move into the interior of the outer joint member beyond distance to which the grooves therein extend from the open end of the member. To prevent the extended portions of the ball grooves from running into one another as a result of the inclination of the grooves, in the further region of the inner joint member they may extend parallel to the axis of the joint member rather than being inclined thereto.

With a joint outer member having a closed end, the grooves may extend a certain distance from the open end thereof and, beyond the extent of the grooves, the joint outer member may have an internal cylindrical surface which provides for the extended plunging movement of the cage and inner joint member.

Joints according to the invention may be used in drive shaft assemblies incorporating two universal joints. At the other end of such a shaft assembly from the joint according to the invention, there may be an axially fixed (non-plunging) universal joint, or there may be a further joint according to the invention. In the latter case, the shaft between the joints is "floating" in use between axial limits provided by the joints at its ends. Depending on the embodiment, use of universal joints according to the invention permits easier assembly by providing increased plunging range in the direction of shortening of the shaft assembly. This facilitates installation in, e.g., motor vehicles where space for installation is limited without dismantling associated parts, e.g. differential units.

BRIEF DESCRIPTION OF DRAWINGS

The invention will now be described by way of example with reference to the accompanying drawings, of which.

DESCRIPTION OF PREFERRED EMBODIMENTS

Figure 1:
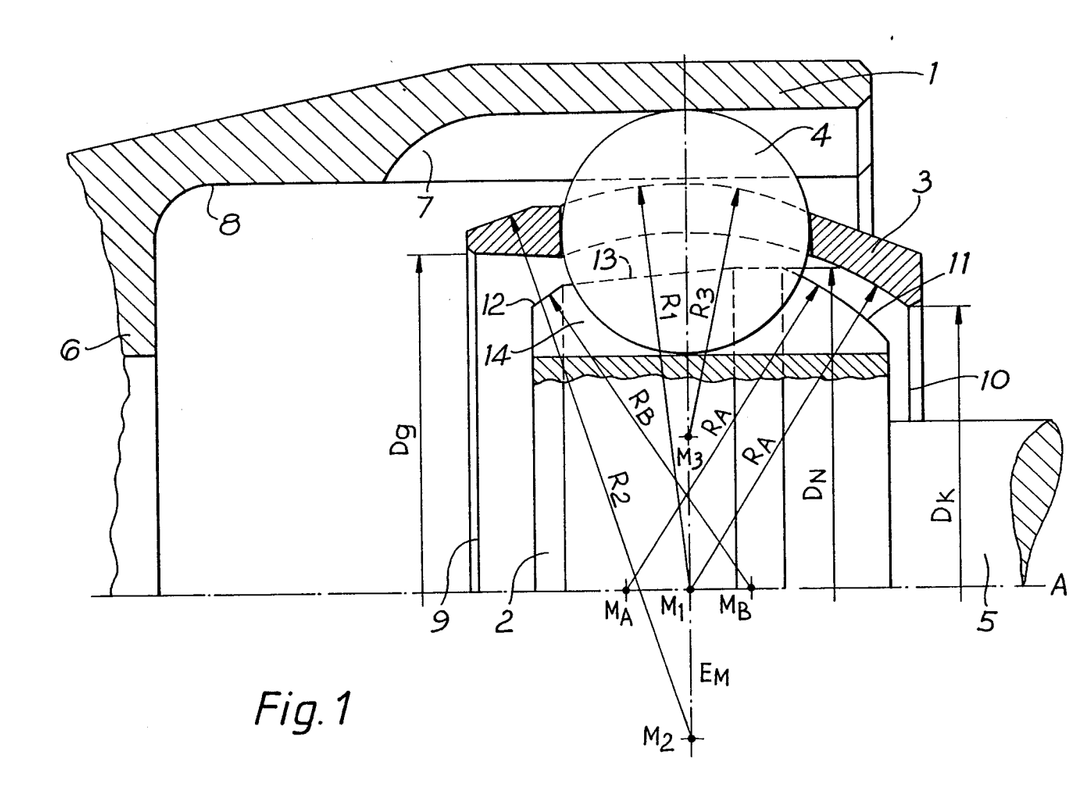
FIG. 1 is a longitudinal half-section through a first embodiment of joint according to the invention.

Referring firstly to FIG. 1 of the drawings, this shows a first embodiment of cross groove universal joint according to the invention. The main parts of the joint are an outer member 1, an inner member 2, a cage 3, and a plurality of torque transmitting balls of which one is shown at 4. The inner joint member 2 is integral with a shaft part 5, and the outer joint member is of hollow form with a closed end 6. Each ball 4 is received in a facing pair of track grooves 7, 14 provided in the outer and inner joint members respectively. In the outer joint member, the grooves extend from the open end thereof towards the closed end 6, and between the grooves the outer joint member has a cylindrical internal surface 8 which continues towards the end 6 by a substantial distance beyond the ends of the grooves. In known manner for a cross groove joint, the grooves in the outer and inner joint members are oppositely inclined to the longitudinal (rotational) axes of their respective joint members, so that as viewed in a direction transverse to such axes the grooves of each pair cross one another and the respective ball is at the crossing of the grooves.

In FIG. 1 and all the following Figures, the joints are shown in the aligned condition, with the axes of the inner and outer joint members and the cage coincident with one another, and referenced A in the drawings.

Further details of the shape of the cage and the inner joint member will be described hereafter, but it will be noted that in the embodiment of FIG. 1 the cage has at its one end, towards the closed end 6 of the outer joint member, an opening 9 whose diameter DG is greater than the maximum external diameter DN of the surface of the inner joint member between the grooves 14 thereof. At its opposite end, the cage has an opening 10 whose diameter DK is less than the external diameter DN of the inner joint member. The balls 4 occupy respective apertures in the cage, so that they are constrained for their centres to occupy a common plane EM.

The configuration of one end of the inner joint member between its grooves comprises a part-spherical stop surface 11 of radius of curvature RA having its centre of curvature MA on the longitudinal axis of the joint member. At its opposite end, the inner joint member has a further part-spherical portion 12 having a radius of curvature RB and its centre of curvature at a position MB on the axis of the joint member, offset axially from the centre of curvature of the stop surface 11. Between such part-spherical surface portions, the external surface 13 of the inner joint member is partly cylindrical and partly frusto-conical.

Figure 2:
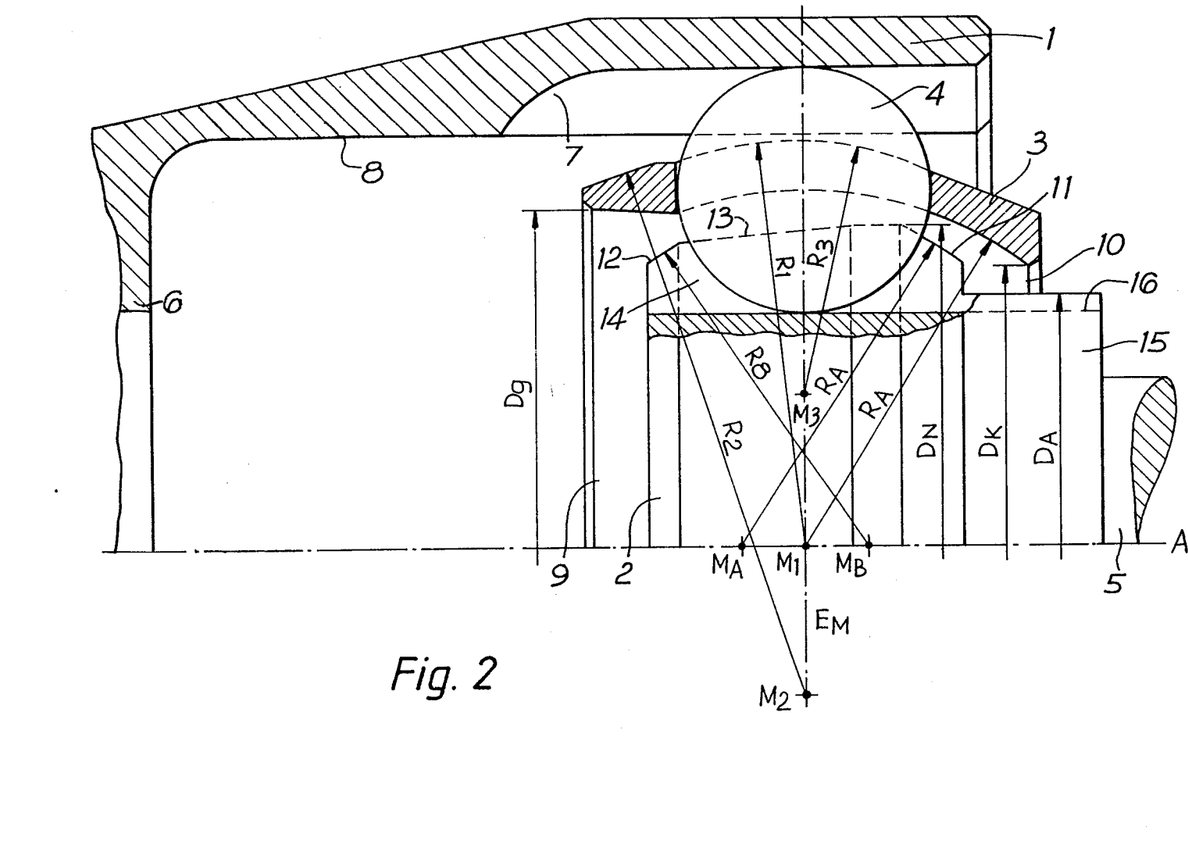
FIG. 2 is a longitudinal half-section through a second embodiment of joint according to the invention.

FIG. 2 of the drawings shows a joint which is basically the same as that of FIG. 1, with corresponding reference numerals used for the same parts. In this joint, however, at its end towards the shaft part 5 and beyond the part-spherical stop surface 11, the inner joint member has a projecting portion 15 which is generally cylindrical, of a diameter DA less than the diameter DK of the smaller opening 10 at the corresponding end of the cage. The ball-receiving grooves continue in the portion 15 of the inner joint member as indicated at 16, except that the continuing grooves 16 are parallel to the axis of the inner joint member rather than being inclined thereto. Such continuing groove portions 16 are able to hold the balls when the inner joint member is moved to the maximum extent towards the closed end 6 of the outer joint member.

Figure 3:
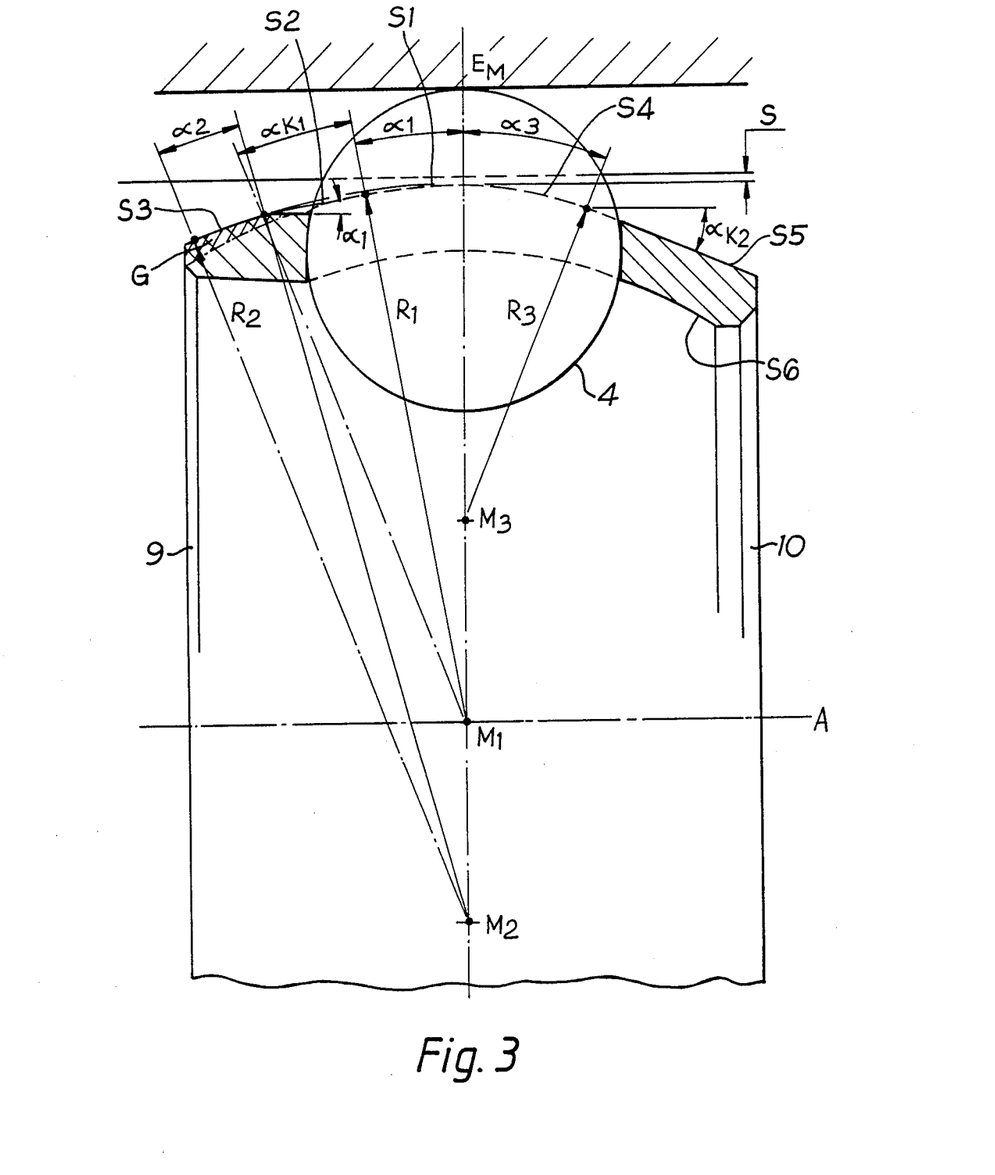
FIG. 3 is a longitudinal half-section through the cage for an embodiment of joint according to the invention.

Referring now to FIG. 3 of the drawings, the cage there shown in detail is an annular shell whose external surface has an external shape which comprises several portions. In the drawing, the longitudinal axis of the cage is indicated at A, and the plane containing the centres of the balls 4, which they are caused to occupy by the apertures in the cage, is indicated at EM.

The external surface of the cage has a part-spherical portion S1 which extends axially from the ball centre plane EM towards the end of the cage having the larger opening 9, by a distance sufficient to subtend an angle $\alpha 1$ at its centre of curvature M1 which lies on the axis A and in the ball centre plane EM. The angle $\alpha 1$ is preferably half the maximum angle of articulation at which the joint is intended for normal operation. Following the part-spherical surface portion, towards the end of the cage having the opening 9, there is a surface portion S2 which is a surface of revolution about the axis of the cage, either frusto conical and tangential to the part-spherical surface or else, as shown, concave, to subtend an angle $\alpha K1$ at the centre M1. If such surface portion is frusto conical, it tapers at an angle equal to the angle $\alpha 1$. This surface portion is followed by a surface of revolution S3 about the axis A which is convex as viewed in longitudinal section of the cage, having a radius of curvature R2 which is greater than the radius of curvature R1 of the part-spherical surface portion of the cage. In the longitudinal section illustrated, the centre of curvature of this convex surface portion lies in the ball centre plane EM, subtending an angle $\alpha 2$ at such centre of curvature.

On the opposite side of the ball centre plane, the cage has a surface portion S4 which is another surface of revolution about the axis A but which has a radius of curvature R3 which is less than the radius R2, such that the sum of the radii R2 and R3 is less than or equal to twice the radius of curvature R1 of the part-spherical cage surface portion S1. In the longitudinal section of the cage, this further surface portion thereof subtends an angle $\alpha 3$ at the centre of curvature M3. The angle $\alpha 3$ is at least half the normal maximum operating angle of the joint, and is preferably equal to half the angle at which the joint requires to be articulated in order to assemble it.

This surface portion is followed by a frusto conical surface portion S5 tapering at an angle $\alpha K2$, which is at least half the assembly angle of the joint.

The internal surface of the cage, starting from the end thereof provided with the larger opening 9, comprises a cylindrical portion which extends as far as the boundaries of the ball-receiving apertures in the cage. Thereafter, the internal surface of the cage generally follows the configuration of the external surface of the cage, so that the wall thickness thereof is substantially constant. Adjacent the end of the cage with the smaller opening 10, the cage has a part-spherical stop surface S6, of radius of curvature RA equal to the radius of curvature RA of the stop surface 11 on the inner joint member.

When a joint according to the invention as above described is to be assembled, the cage 3 can be fitted over the inner joint member 2 from the side of the latter from which the shaft part 5 extends. Because the opening 9 at the one end of the cage has a diameter DG greater than the maximum external diameter DN of the inner joint member, it is not necessary to articulate or tilt the cage relative to the inner joint member to do this. Thereafter, the inner joint member and cage can be inserted into the open end of the outer joint member. The balls can then be individually introduced into the apertures in the cage and the facing pairs of grooves in the joint member, this requiring articulation of the inner joint member relative to the outer joint member in an appropriate direction, through the assembly angle, which as above referred to is greater than the normal maximum operating angle of the joint. It will be appreciated that the cage articulates relative to the outer joint member through half the angle by which the inner joint member articulates, and the cage has sufficient clearance to do this by virtue of the above described arrangement and angles of the external surface portions thereof, particularly the portions S3 and S5 which lie adjacent the internal surface of the outer joint member when the joint is articulated at the assembly angle.

Once the joint is assembled, in normal use up to the maximum operating angle of the joint, it is the surface portions S1 and S4 of the cage which lie adjacent the internal surface of the outer joint member. The configuration of these surface portions ensures that there is always an adequate clearance, as shown at S in FIG. 3, here. The configuration of the surface portions S2 and S3 of the external surface of the cage ensures that, despite this end of the cage having the large opening 9, the cage has sufficient wall thickness for adequate strength in this region. An effective increase in the wall thickness of the cage is obtained, as indicated at G in FIG. 3.

In the assembled joint, relative plunging movement between the inner and outer joint members in the direction to increase the length of the joint, i.e. to move the inner joint member out of the outer joint member at the open end of the latter, is possible until the surface 11 of the inner joint member contacts the corresponding stop surface S6 within the cage. In the opposite direction of plunging movement, to shorten the joint, the inner joint member does not contact the cage so a very large plunging movement is possible. Where the inner joint member has its extension portion 15 with the continuing grooves 16, the inner joint member can move towards the closed end of the outer joint member by a distance substantially beyond the distance by which the grooves 7 extend into the outer joint member, and during such movement the balls remain engaged in the continuing grooves 16. Under such conditions, which are intended for installation purposes, the torque transmitting capacity of the joint is much reduced.

Figure 4:
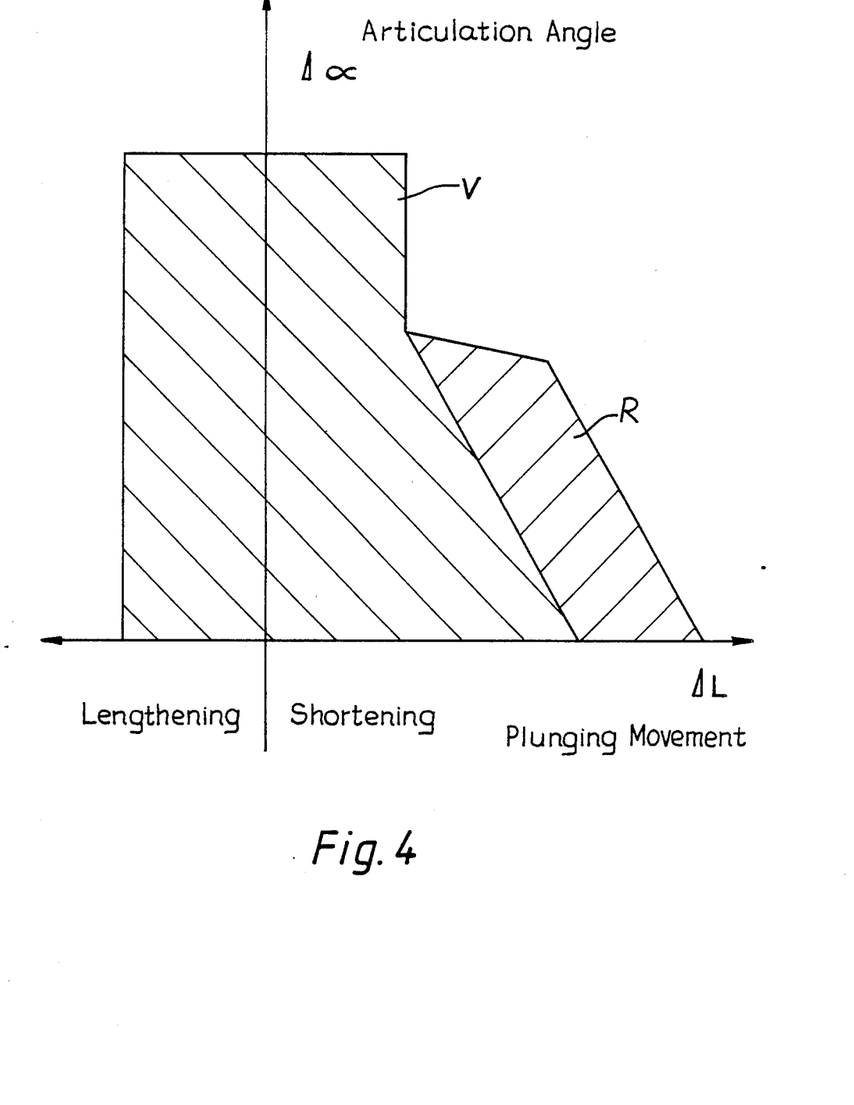
FIG. 4 is an angle-distance diagram for a joint according to the invention.

FIG. 4 shows qualitatively the torque transmitting capacity of a joint according to the invention, related to the articulation angle of the joint and plunging movement thereof. There is a region V in which the joint has its full capacity, which is applicable for a wide range of articulation angles and plunging movement. In the direction of lengthening of the joint, the above described engagement of the stop surfaces of the inner joint member and cage limits the plunging movement, and the capacity of the joint is unimpaired up to this limit. For plunging movement in the direction of shortening of the joint, however, there is no limiting stop and hence there is a region R, corresponding to the above described shortening of the joint for installation purposes, wherein the capacity of the joint is substantially reduced.

Figure 5:
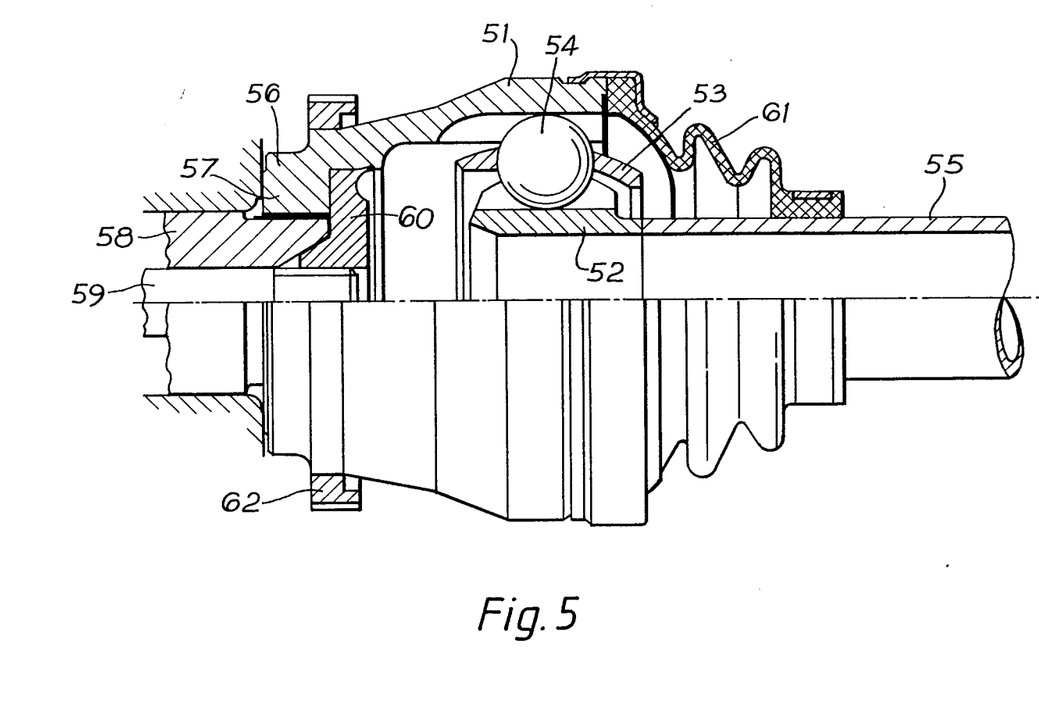
FIG. 5 shows, partly in section, an embodiment of joint according to the invention.

FIG. 5 shows diagrammatically a universal joint according to the invention intended for use at the wheel end of a drive shaft assembly by which a wheel is to be driven. The joint is generally as shown in FIG. 1, comprising an outer joint member 51, inner joint member 52, cage 53, and torque transmitting balls of which one is seen at 54. In this case, the shaft element to which the inner joint member 52 is non-detachably connected is of tubular form, as indicated at 55. At its end 56, the outer joint member is provided with a formation 57 with internal teeth for torque transmission with hub member 58. The joint member is held to the hub member by an axially extending bolt 59 engaging with a nut 60 received at the end 56 of the outer joint member and closing such end. Also shown in FIG. 5 is a flexible sealing boot 61 connected between the outer joint member 51 and the shaft 55, and a toothed pulse emitting element 62 fitted on the outside.

Figure 6:
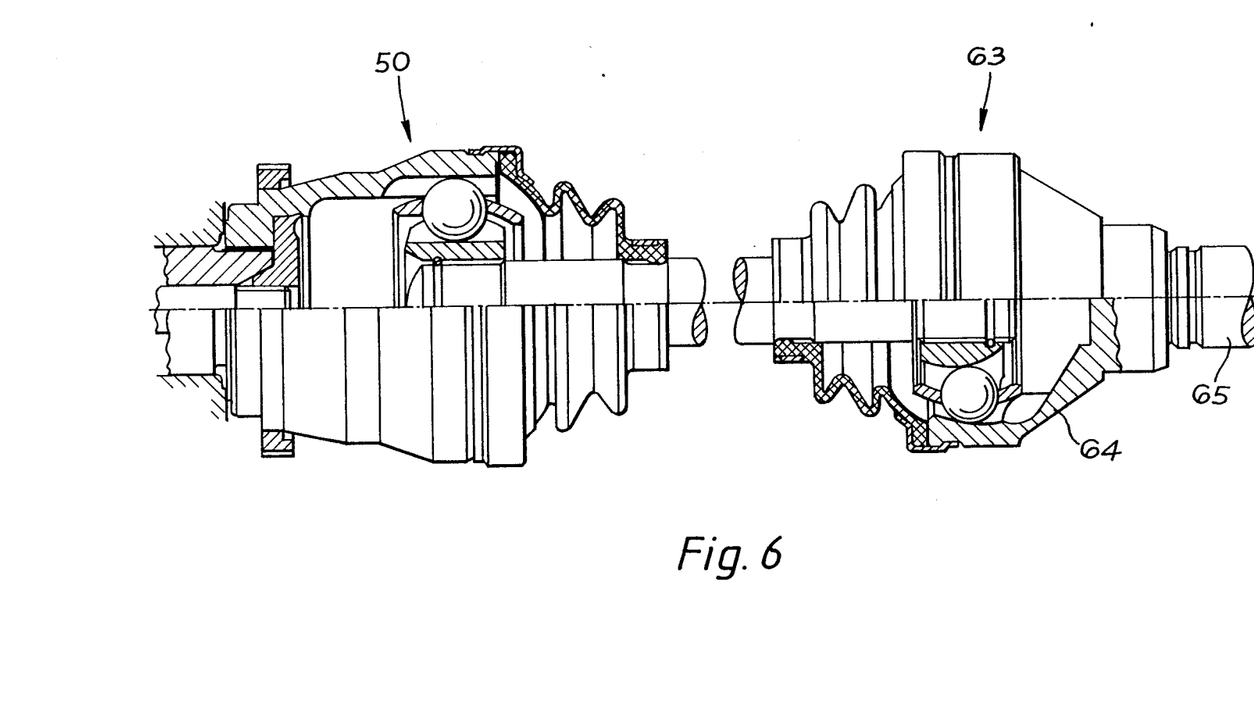
FIGS. 6, 7 and 8 are partly sectioned views of drive shafts incorporating joints according to the invention.

FIG. 6 shows a complete drive shaft assembly, incorporating at one end a joint 50 according to the invention and generally as shown in FIG. 5 except that it has a solid shaft member which is detachable from the inner joint member. At the other end of the shaft assembly there is a joint 63 which is a non-plunging universal joint of known type. The joint 63 has an outer joint member 64 with a stub shaft 65 for connection to, e.g., an output member of a differential unit. The range of plunging movement afforded by the joint 50, particularly in the direction of shortening of the overall length of the drive shaft assembly, facilitates installation of the shaft assembly in a vehicle.

Figure 7:
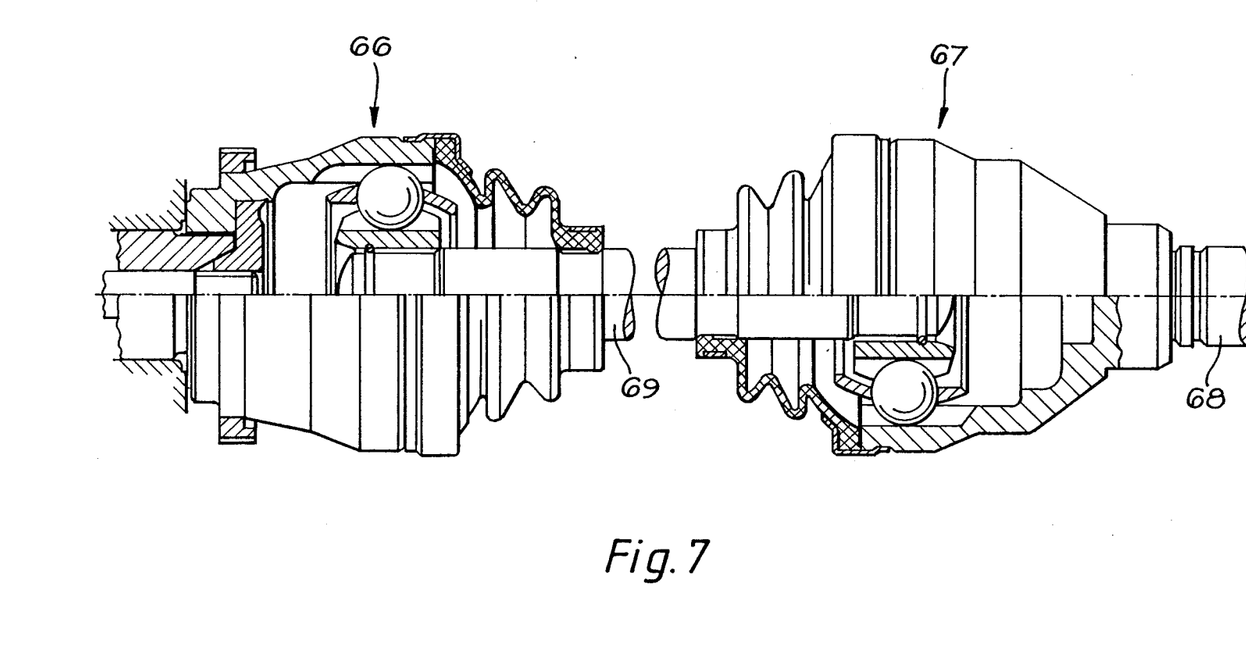

FIG. 7 shows a drive shaft assembly which has universal joints 66, 67 at its respective ends. The joint 66 is the same as the joint 50. The joint 67 is the same in respect of the configuration of its cage and inner joint member, but its outer joint member is integral with a stub shaft 68. The two plunging joints in accordance with the invention provide for a very large shortening of the entire shaft assembly for installation purposes. The shaft 69, connecting the inner members of the two universal joints can float axially relative to the two outer joint members, between limits determined by the stops afforded in the direction of joint lengthening by each universal joint.

Figure 8:
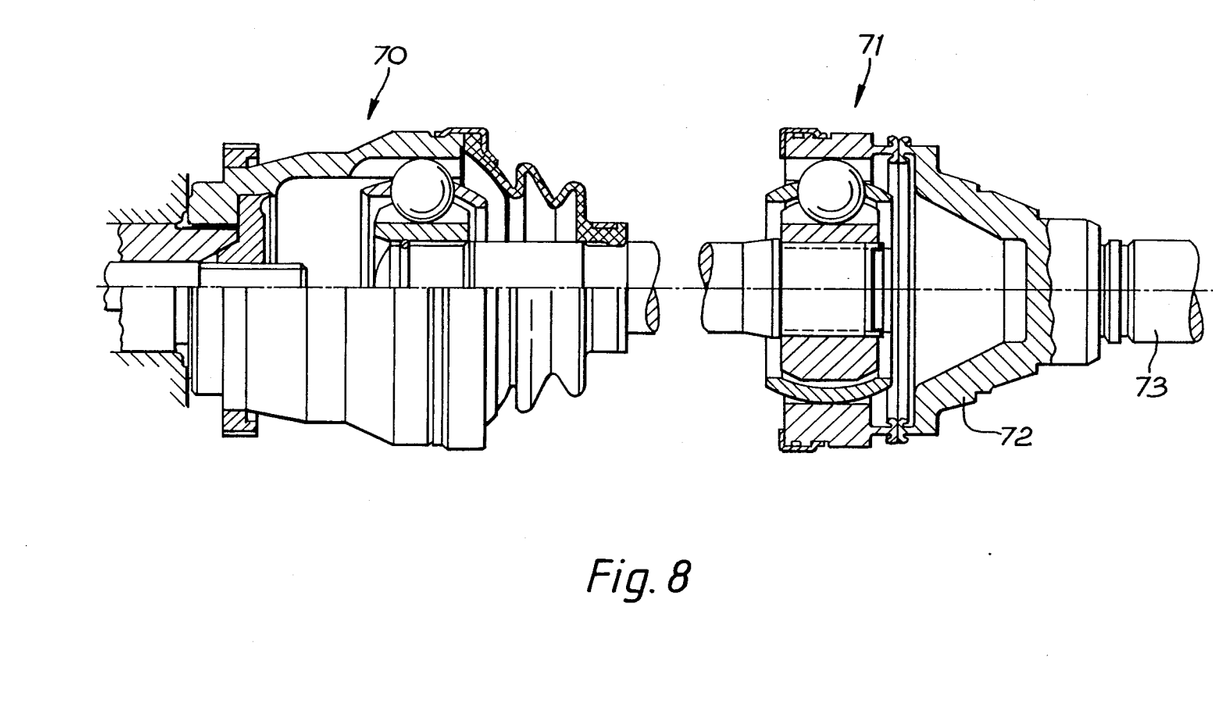

FIG. 8 shows a shaft assembly provided at one end with a universal joint 70 which is the same as the joint 50. At the other end of the shaft assembly, there is a universal joint 71 which is a cross groove joint of conventional type. In this joint, the outer joint member is friction welded to a connecting component 72 having a stub shaft 73. This shaft assembly, as for the embodiment of FIG. 7, affords a relatively large reduction in the overall length of the shaft assembly, for installation purposes.

We claim:

1. A cross groove constant velocity ratio universal joint, comprising:
   an outer joint member;
   an inner joint member;
   the inner and outer joint members having circumferentially disposed axially extending facing pairs of grooves, the grooves of each pair being oppositely inclined to the rotational axes of their joint members so that they cross one another as viewed in a direction transverse to said axes;
   a plurality of balls disposed one in each facing pair of grooves, for torque transmission between the joint members;
   and a cage of annular form disposed between the joint members, the cage having apertures wherein the balls are received to constrain the balls such that their centers occupy a ball center plane;
   wherein, as viewed in longitudinal section, the cage is asymmetrical and has at one end an opening of a diameter greater than a maximum diameter of the inner joint member, and at its other end has an opening of a diameter smaller than said maximum diameter of the inner joint member, so that the cage can be fitted axially over the inner joint member from said one end thereof, and said other end of the cage forms a stop for limiting relative axial movement between the cage and inner joint member, the external surface of the cage comprising a number of longitudinally extending portions of different configuration from one another, the portions including a first portion, towards the end of the cage having the larger diameter opening, and a further portion towards the end of the cage having the smaller diameter opening, both of which portions are convex surfaces of revolutions about the longitudinal axis of the cage and which, as viewed in longitudinal section of the cage, having centers of curvature which lie in the ball center plane but which are offset from said cage axis, the first portion having a radius of curvature greater than that of the further portion.

2. A universal joint according to claim 1 wherein the external surface of the cage further comprises a part-spherical portion in the region of the apertures of the cage.

3. A universal joint according to claim 2 wherein the external surface of the cage includes a transition portion between said part-spherical surface portion thereof and the first said convex surface portion thereof, said transmission portion being either a frusto conical surface portion tangential to said part-spherical surface portion, or a surface of rotation about the axis of the cage which is concave as viewed in longitudinal section of the cage.

4. A universal joint according to claim 2 wherein the radius of curvature of said part-spherical surface portion lies between the radii of curvature of said first and further convex surface portions, and the centre of curvature of said part-spherical surface portion lies in the ball centre plane.

5. A universal joint according to claim 4 wherein said part-spherical surface portion of the external surface of the cage extends from the ball centre plane towards the end of the cage having the larger opening, by a distance sufficient to subtend approximately half the normal maximum operating angle of the joint at its centre of curvature.

6. A universal joint according to claim 4 wherein the sum of the said radii of curvature, as viewed in longitudinal section of the cage, of said first and further convex surface portions of the cage is substantially equal to or slightly less than twice the radius of curvature of said part-spherical surface portion of the cage.

7. A universal joint according to claim 1 wherein said further convex surface portion of the cage extends from the ball centre plane to subtend at least half the normal maximum operating angle of the joint at its centre of curvature, as viewed in longitudinal section of the cage.

8. A universal joint according to claim 7 wherein said further convex surface portion is followed, towards the end of the cage, by a frusto conical surface portion which tapers at at least half the assembly angle of the joint.

9. A universal joint according to claim 1 wherein the internal surface of the cage comprises a first portion of cylindrical configuration, extending from the end of the cage with the larger opening as far as the boundaries of the apertures in the cage wherein the balls are received, followed by a portion whose configuration approximately follows that of the external surface of the cage to give a substantially constant wall thickness.

10. A universal joint according to claim 9 wherein the internal surface of the cage comprises, adjacent the end of the cage having a smaller opening, a part-spherical portion forming a stop surface.

11. A universal joint according to claim 10 wherein the inner joint member has a corresponding part-spherical stop surface engagable with the said stop surface in the cage.

12. A universal joint according to claim 11 wherein the inner joint member has, at its end opposite the said stop surface, a part-spherical surface having the same radius of curvature as that of said stop surface, but with its centre of curvature offset along the axis of the inner joint member from the centre of curvature of said stop surface.

13. A universal joint according to claim 12, wherein, between said part-spherical surfaces and extending longitudinally thereof, the inner joint member has an external surface which is of a linear sectional configuration.

14. A cross groove constant velocity ratio universal joint, comprising:
    an outer joint member;
    an inner joint member;
    the inner and outer joint members having circumferentially disposed axially extending facing pairs of grooves, the grooves of each pair being oppositely inclined to the rotational axes of their joint members so that they cross one another as viewed in a direction transverse to said axes;
    a plurality of balls disposed one in each facing pair of grooves, for torque transmission between the joint members;
    and a cage of annular form disposed between the joint members, the cage having apertures wherein the balls are received to constrain the balls such that their centers occupy a ball center plane;
    wherein, as viewed in longitudinal section, the cage is asymmetrical and has at one end an opening of a diameter greater than a maximum diameter of the inner joint member, and at its other end has an opening of a diameter smaller than said maximum diameter of the inner joint member, so that the cage can be fitted axially over the inner joint member from said one end thereof, and said other end of the cage forms a stop for limiting relative axial movement between the cage and inner joint member, the internal surface of the cage comprising a first portion of cylindrical configuration, extending from the end of the cage with the larger opening as far as the boundaries of the apertures in the cage wherein the balls are received, followed by a portion whose configuration approximately follows that of the external surface of the cage to give a substantially constant wall thickness, and a part-spherical portion provided adjacent the end of the cage having a smaller opening so as to form a stop surface, the inner joint member having a corresponding part-spherical stop surface engageable with the said stop surface in the cage, additionally, the inner joint member being provided, beyond said stop surface thereof, with a generally cylindrical extension in which the ball-receiving grooves are continued, said cylindrical extension having an outside diameter smaller than the diameter of the smaller opening at the adjacent end of the cage.

15. A universal joint according to claim 14, wherein the ball-receiving grooves in said extension of the inner joint member are substantially parallel to the axis thereof.

16. A universal joint according to claim 15 wherein the ball-receiving grooves in the outer joint member extend a certain distance into the interior of the outer joint member from an open end thereof, and between the grooves the outer joint member affords a cylindrical guide surface which extends towards a closed end of the outer joint member by a substantial amount beyond said distance.

17. A cross groove constant velocity ratio universal joint, comprising
    an outer joint member;
    an inner joint member;
    the inner and outer joint members having circumferentially disposed axially extending facing pairs of grooves, the grooves of each pair being oppositely inclined to the rotational axes of their joint members so that they cross one another as viewed in a direction transverse to said axes;
    a plurality of balls disposed one in each facing pair of grooves, for torque transmission between the joint members;
    and a cage of annular form disposed between the joint members, the cage having apertures wherein the balls are received to constrain the balls such that their centres occupy a ball centre plane;
    the cage having an asymmetrical internal surface, comprising at one end an opening of a diameter greater than a maximum diameter of the inner joint member, and at its other end an opening of a diameter smaller than said maximum diameter of the inner joint member, so that the cage can be fitted axially over the inner joint member from said one end thereof, and said other end of the cage forms a stop for limiting relative axial movement between the cage and inner joint member;
    the cage further having an asymmetrical external surface comprising a number of longitudinally extending portions of different configuration from one another, including a first portion, towards the end of the cage having the larger diameter opening; a further portion towards the end of the cage having the smaller diameter opening, both of which portions are convex surfaces of revolution about the longitudinal axis of the cage and which, as viewed in longitudinal section of the cage, have centres of curvature which lie in the ball centre plane but which are offset from said cage axis, the first portion having a radius of curvature greater than that of the further portion; and a portion in the region of the apertures in the cage, the sum of the radii of curvature of the first and further said convex portions being at most substantially equal to the maximum diameter of said portion in the region of the apertures in the cage.

* * * * *